(12) United States Patent
Redaelli et al.

(10) Patent No.: US 12,525,274 B2
(45) Date of Patent: Jan. 13, 2026

(54) POWER HOLD-OFF CIRCUIT

(71) Applicant: Micron Technology, Inc., Boise, ID (US)

(72) Inventors: Marco Redaelli, Munich (DE); Hongyan Li, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 139 days.

(21) Appl. No.: 18/511,473

(22) Filed: Nov. 16, 2023

(65) Prior Publication Data

US 2024/0170044 A1 May 23, 2024

Related U.S. Application Data

(60) Provisional application No. 63/479,629, filed on Jan. 12, 2023.

(30) Foreign Application Priority Data

Nov. 18, 2022 (WO) ................ PCT/CN2022/132826

(51) Int. Cl.
*G11C 5/14* (2006.01)
*G11C 11/4074* (2006.01)
(52) U.S. Cl.
CPC .......... *G11C 11/4074* (2013.01); *G11C 5/141* (2013.01); *G11C 5/147* (2013.01)
(58) Field of Classification Search
CPC ..... G11C 11/4074; G11C 5/141; G11C 5/147; G11C 5/143; H02J 7/345
See application file for complete search history.

(56) References Cited

U.S. PATENT DOCUMENTS

| | | | |
|---|---|---|---|
| 7,352,626 B1 * | 4/2008 | Wu | G11C 5/14 365/185.23 |
| 9,484,069 B2 * | 11/2016 | Shim | G11C 5/141 |
| 9,747,200 B1 * | 8/2017 | Micheloni | G06F 12/0246 |
| 9,754,634 B2 * | 9/2017 | Shen | G11C 5/141 |
| 10,234,931 B2 * | 3/2019 | Oh | G11C 14/0009 |
| 11,404,906 B1 * | 8/2022 | Wang | H02M 1/008 |
| 2004/0190210 A1 * | 9/2004 | Leete | G06F 11/2015 714/E11.12 |

(Continued)

FOREIGN PATENT DOCUMENTS

| | | |
|---|---|---|
| GB | 2371376 B | 7/2004 |
| JP | 2002320338 A | 10/2002 |

OTHER PUBLICATIONS

International Search Report and Written Opinion for Application No. PCT/CN2022/132826, mailed on Jun. 23, 2023, 7 Pages.

*Primary Examiner* — Khamdan N. Alrobaie
(74) *Attorney, Agent, or Firm* — Harrity & Harrity, LLP

(57) ABSTRACT

Implementations described herein relate to a power hold-off circuit and power hold-off circuit operation. In some implementations, a system may include a battery, and a power hold-off circuit. The power hold-off circuit may include a step-up regulator, an abrupt power-loss (APL) switch, and one or more power hold-off capacitors. The APL switch may be connected to the battery when a voltage from the battery satisfies a voltage threshold. The APL switch may be connected to a step-down regulator or one or more power hold-off capacitors when the voltage from the battery does not satisfy the voltage threshold.

20 Claims, 6 Drawing Sheets

(56) References Cited

U.S. PATENT DOCUMENTS

| | | | |
|---|---|---|---|
| 2005/0007089 A1* | 1/2005 | Niiyama | H02M 3/1582 |
| | | | 323/284 |
| 2010/0289473 A1 | 11/2010 | Ishii et al. | |
| 2012/0139516 A1 | 6/2012 | Tsai et al. | |
| 2012/0271990 A1* | 10/2012 | Chen | G11C 29/52 |
| | | | 711/E12.008 |
| 2017/0256292 A1* | 9/2017 | McCombs | G11C 5/147 |
| 2022/0084604 A1* | 3/2022 | Yamasaki | G11C 16/0483 |

* cited by examiner

POWER HOLD-OFF CIRCUIT

CROSS-REFERENCE TO RELATED APPLICATION

This patent application claims priority to PCT Patent Application No. PCT/CN2022/132826, filed on Nov. 18, 2022, and entitled "POWER HOLD-OFF CIRCUIT," and to U.S. Provisional Patent Application No. 63/479,629, filed on Jan. 12, 2023, and entitled "POWER HOLD-OFF CIRCUIT." The disclosures of the prior applications are considered part of and are incorporated by reference into this patent application.

TECHNICAL FIELD

The present disclosure generally relates to memory devices, memory device operations, and, for example, to a power hold-off circuit.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
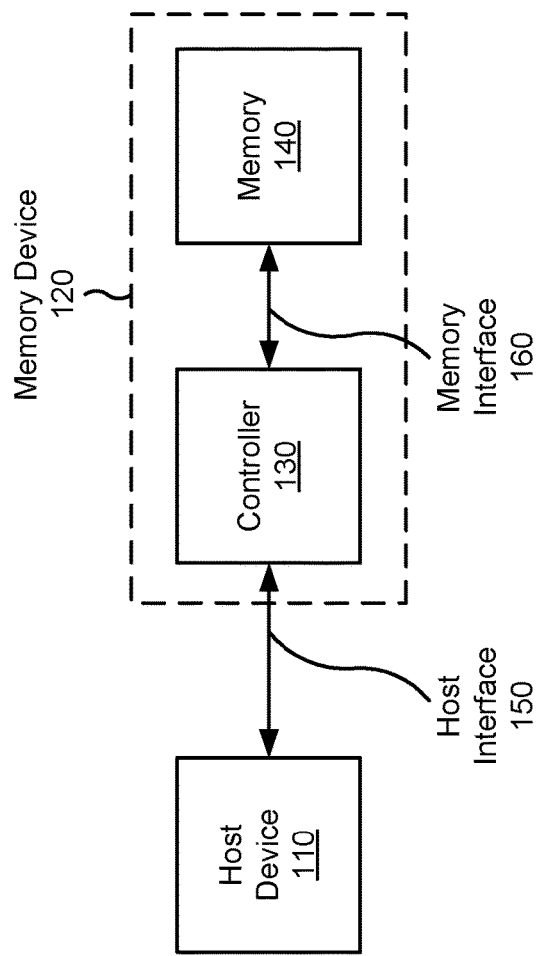
FIG. 1 is a diagram illustrating an example system capable of power hold-off circuit operation.

Centralized storage may be used to enable virtual machines and operating systems from different domains to share data. For example, in an automotive central architecture, the centralized storage may enable the virtual machines and operating systems to share data and to simplify data sharing between functional systems such as in-vehicle infotainment (IVI), Cluster, and advanced driver assistance systems (ADAS), among other examples. Cluster may include various displays and indicators that enable a driver to operate the automobile.

Solid-state drives (SSDs) may require power management circuitry that includes features such as voltage hold-off circuitry and power loss detection to be used for data protection during an abrupt power loss (APL) event. This may be used to prevent any flash translation layer (FTL) damage that may result in performance of a write protect operation. In data center applications, the main system power may be backed-up through a secure and highly available uninterruptable power supply (UPS). Consequently, a power hold time of two seconds to ten seconds (2 s to 10 s) in the case of an APL event may be reasonable. In some cases, an SSD form factor (e.g., for a U2 device) may have a back-up capacitor on board to be used in the case of the APL event. In enterprise applications, for embedded applications such as automotive, industrial, and the Internet of Things (IOT), a smaller SSD (e.g., ball grid array (BGA)) form factor may not be able to have an on-board capacitor, and an optimized design may require a power hold-off time in the range of only thirty milliseconds to one hundred milliseconds (30 ms to 100 ms).

In some cases, a power management integrated circuit (PMIC) and power hold-off circuitry may be located on board the device (e.g., inside of a drive envelope). In some other cases (such as for BGA devices), the PMIC and power hold-off circuitry may be located outside of the drive envelope and may be part of a customer board design. However, the power back-up for the BGA devices may be complex, may have excessive noise, and may be expensive due to the capacitors that are necessary to sustain power for the 30-100 ms. This may be particularly true in automotive applications. For example, the capacitors used in automotive applications may need to have an extended lifetime and an extended operating range of −40° C. to 130° C.

In some implementations, a system may include a battery and a power hold-off circuit. The power hold-off circuit may include a step-up regulator, a switch, and one or more power hold-off capacitors. The switch may be connected to the step-up regulator during a standard operation, such as when a voltage from the battery satisfies a voltage threshold. Alternatively, the switch may be connected to a step-down regulator or an output of the step-up regulator during an APL event, such as when the voltage from the battery does not satisfy the voltage threshold. When the switch is connected to the step-up regulator, the power hold-off capacitors may be charged by the step-up regulator using power from the battery. During the standard operation, such as when the battery is connected to the system, a first set of components and a second set of components may be powered by the battery. The first set of components may include devices that do not require a power backup, while the second set of components may require devices that do require a power backup. For example, the first set of components may include a DRAM while the second set of components may include an SSD.

When an APL event occurs, such as when the voltage from the battery drops below the voltage threshold, the one or more power hold-off capacitors may charge the second set of components but may not charge the first set of components. For example, based on an occurrence of the APL event, the switch may connect to the step-down regulator, thereby enabling the power hold-off capacitors to discharge power to the second set of components but not the first set of components.

In some implementations, the system may include the step-down regulator, and both the step-up regulator and the step-down regulator may remain on during the standard operation and during the APL. Keeping the step-up regulator and the step-down regulator in the on state during the standard operation and during the APL may allow redundant energy stored in the voltage battery power plane and in the capacitors to be used as much as possible, which may improve the power hold-off time. In some other implementations, the switch may connect to the power hold-off capacitors (e.g., without a step-down regulator) during the APL. This may reduce a complexity and/or cost of the system. Additional details are described herein.

FIG. 1 is a diagram illustrating an example system 100 capable of power hold-off circuit operation. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the system 100 includes a battery and a power hold-off circuit, wherein the power hold-off circuit comprises: a step-up regulator; a step-down regulator; an APL switch; and one or more power hold-off capacitors, wherein the APL switch is connected to the battery when a voltage from the battery satisfies a voltage threshold and is connected to the step-down regulator when the voltage from the battery does not satisfy the voltage threshold.

In some implementations, system 100 includes a battery and a power hold-off circuit, wherein the power hold-off circuit comprises: a step-up regulator; an APL switch; and one or more power hold-off capacitors, wherein the switch is connected to the battery when a voltage from the battery satisfies a voltage threshold and is connected to the one or more power hold-off capacitors when the voltage from the battery does not satisfy the voltage threshold.

In some implementations, the system 100 may be configured to power a memory device using power from a battery based on a voltage satisfying a voltage threshold; and power the memory device using power from a power hold-off circuit based on the voltage not satisfying the voltage threshold, wherein the power hold-off circuit comprises: a step-up regulator; an APL switch; and one or more power hold-off capacitors.

As indicated above, FIG. 1 is provided as an example. Other examples may differ from what is described with regard to FIG. 1.

Figure 2:
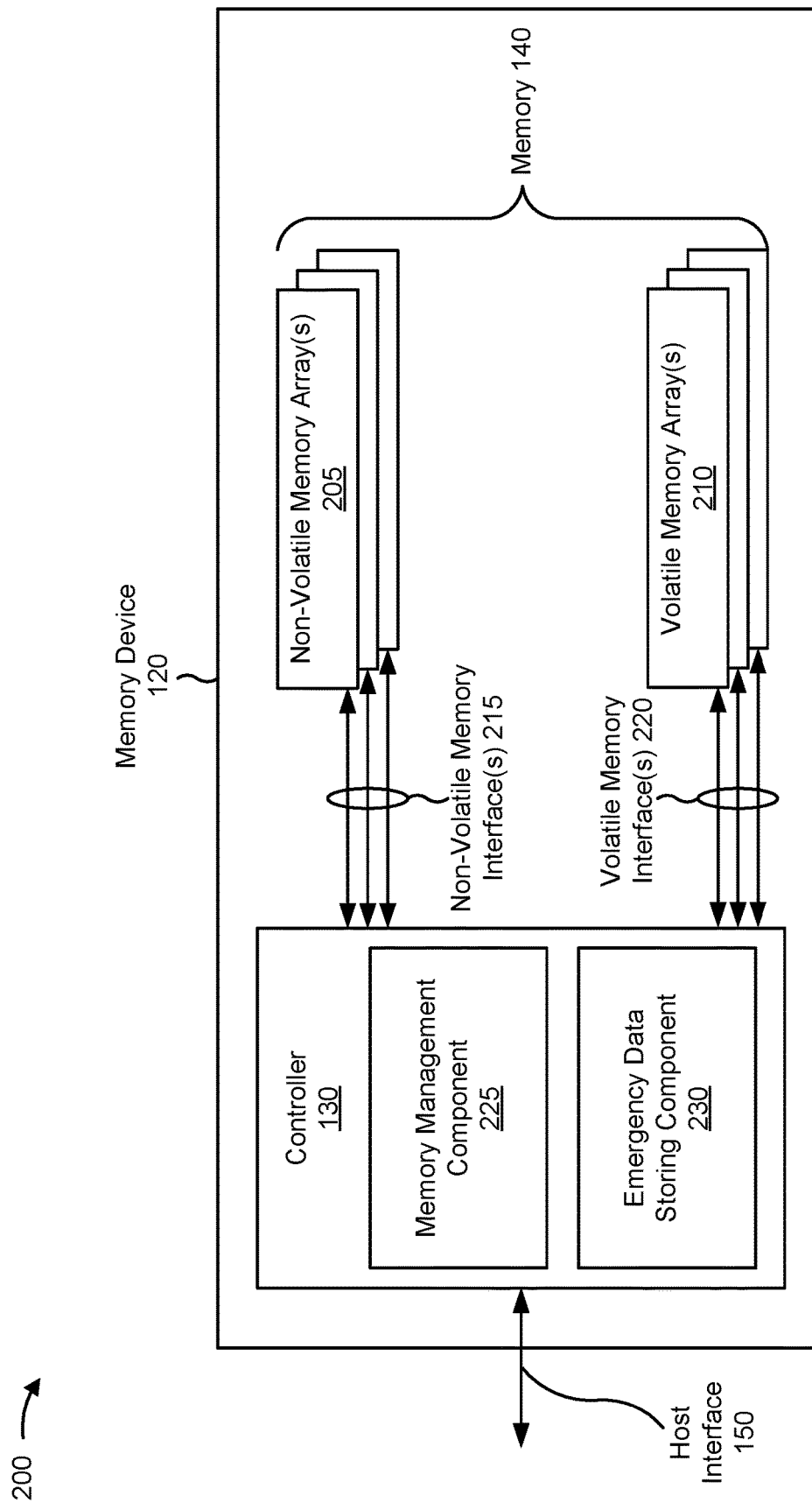
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225 and/or an emergency data storing component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The emergency data storing component 230 may be configured to detect an emergency data storing event and to initiate and/or perform an emergency data storing operation. The emergency data storing event may be an APL event or may be based on an occurrence of the APL event. The APL event may occur when a voltage from a battery that is powering the memory device 120 falls below a voltage threshold. The voltage from the battery may fall below the voltage threshold, for example, when the battery becomes disconnected from the memory device 120. The emergency data storing component 230 and/or the memory device 120 may receive power from a power hold-off circuit based on the occurrence of the APL event, and may perform at least one of an emergency power fail (EPF) data storing operation or a forced quiescence (FQ) data storing operation, among other examples. Additional details are described herein.

One or more devices or components shown in FIG. 2 may be configured to perform operations described elsewhere herein, such as one or more operations and/or methods described in connection with FIG. 3. For example, the controller 130, the memory management component 225 and/or the emergency data storing component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

As indicated above, FIG. 2 is provided as an example. Other examples may differ from what is described with regard to FIG. 2.

Figure 3:
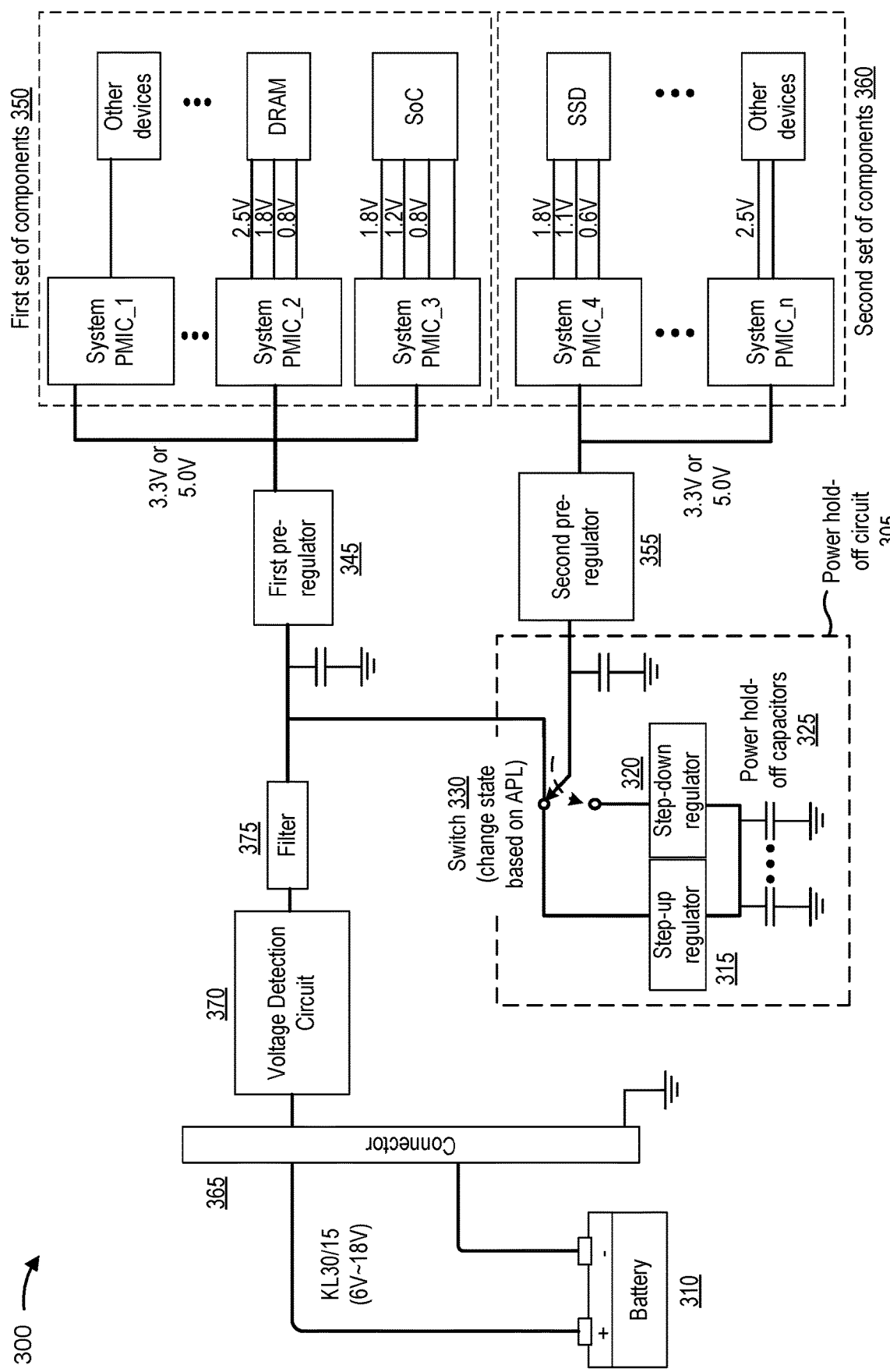
FIG. 3 is a diagram illustrating an example system that includes a power hold-off circuit.

FIG. 3 is a diagram illustrating an example system 300 that includes a power hold-off circuit. The system 300 may include the power hold-off circuit 305 and a battery 310. The power hold-off circuit 305 may include a step-up regulator 315, a step-down regulator 320, and one or more power hold-off capacitors 325. The step-up regulator 315 may be configured to receive an input voltage and to output an output voltage that is higher than the input voltage. The step-up regulator 315 may enable the power hold-off capacitors 325 to be charged at a higher voltage (such as 12 V, 18 V, or 35 V, among other examples). The step-down regulator 320 may be configured to receive an input voltage and to output an output voltage that is lower than the input voltage. The step-down regulator 320 may enable system components or devices that require a power backup for emergency data storing to be charged by the power hold-off capacitors 325 at a lower voltage (such as 3.3 V or 5 V). The power hold-off capacitors 325 may be configured to charge one or more system components or devices when a voltage from the battery falls below a voltage threshold and/or based on an occurrence of an APL event. The APL event may occur, for example, when the battery 310 becomes disconnected from the system 300. The power hold-off circuit 305 may include a switch 330. The switch 330 may be connected to the battery 310 when the voltage from the battery satisfies the voltage threshold and may be connected to the step-down regulator 320 when the voltage from the battery does not satisfy the voltage threshold.

The system 300 may include one or more pre-regulators. A first pre-regulator 345 may be located in a path that is between the battery 310 and a first set of components 350. The first set of components 350 may include devices that do not require a power backup and/or may include devices that do not need to perform emergency data storing prior to a power loss. For example, the first set of components 350 may include a DRAM or a system-on-chip (SOC) device. A second pre-regulator 355 may be located in a path that is between the battery 310 and a second set of components 360. The second set of components 360 may include devices that require a power backup in the event of a power loss. For example, the second set of components may include an SSD.

In some implementations, the system 300 may include a connector 365. The connector 365 may be connected to the battery 310 and may be connected to a ground. The system 300 may include a voltage detection circuit 370. The voltage detection circuit 370 may be, for example, a reverse under-voltage over-voltage protection circuit. The voltage detection circuit 370 may be configured to detect whether the voltage from the battery satisfies the voltage threshold. For example, the voltage detection circuit 370 may detect that the voltage from the battery satisfies the voltage threshold based on the voltage from the battery being greater than, or greater than or equal to, the voltage threshold, or may detect that the voltage from the battery does not satisfy the voltage threshold based on the voltage from the battery being less than, or less than or equal to, the voltage threshold. The system 300 may include a filter 375. The filter 375 may be, for example, a low-pass filter, a high-pass filter, a band-pass filter, or a notch filter, among other examples.

In some implementations, the battery 310 may be in a connected state. When the battery 310 is in the connected state, the switch 330 may be connected to the battery 310. The voltage from the battery 310 may satisfy the voltage threshold. For example, the voltage from the battery 310 may be 6 V. 12 V, or 18 V. When the battery 310 is in the connected state, current may flow from the battery 310 to the connector 365, from the connector 365 to the voltage detection circuit 370, and from the voltage detection circuit 370 to the filter 375.

In some implementations, current may flow from the filter 375 to the first pre-regulator 345. For example, current may flow from the filter 375 to a capacitor, from the capacitor to the first pre-regulator 345, and from the first pre-regulator 345 to the first set of components 350. The first pre-regulator 345 may perform voltage regulation and may have an output voltage that is equal to 3.3 V or 5 V. The first set of components 350 may include one or more power management integrated circuits (PMICs), such as PMIC_1, PMIC_2, and PMIC_3. The first set of components 350 may include one or more devices that do not require a power backup based on the occurrence of the APL event. For example, the PMIC_2 may be connected to a DRAM, and the PMIC_3 may be connected to an SOC device.

In some implementations, current may flow from the filter 375 to the second pre-regulator 355. For example, current may flow from the filter 375 to a capacitor, from the capacitor to the second pre-regulator 355, and from the second pre-regulator 355 to the second set of components 360. The second pre-regulator 355 may perform voltage regulation and may have an output voltage that is equal to 3.3 V or 5 V. The second set of components 360 may include one or more PMICs, such as PMIC_4, and PMIC_n. Each of the PMICs may have an input voltage of 3.3 V or 5 V based on the output of the second pre-regulator 355. The second set of components 350 may include one or more devices that require a power backup based on the occurrence of the APL event. For example, the PMIC_4 may be connected to an SSD.

In some implementations, current may flow from the filter 375 to the power hold-off circuit 305. For example, current may flow from the filter 375 to an input of the power hold-off circuit 305. Additionally, current may flow from the input of the power hold-off circuit 305 to the step-up regulator 315, and from the step-up regulator 315 to the one or more power hold-off capacitors 325. This may enable the one or more power hold-off capacitors 325 to be charged by the step-up regulator 315 using power from the battery 310 at the higher voltage (such as 12 V. 18 V, or 35 V) when the battery 310 is in the connected state.

In some implementations, the system 300 may experience an APL event. The APL event may occur, for example, when the voltage from the battery 310 falls below the voltage threshold, such as when the battery 310 becomes disconnected from the system 300. In some implementations, the voltage detection circuit 370 (such as the reverse under-voltage over-voltage protection circuit) may detect that the voltage from the battery satisfies the voltage threshold based on the voltage from the battery being greater than, or greater than or equal to, the voltage threshold, or may detect that the voltage from the battery does not satisfy the voltage threshold based on the voltage from the battery being less than, or less than or equal to, the voltage threshold. In some implementations, the voltage threshold may be a voltage that is between 5 V and 6 V. For example, the voltage from the battery 310 may drop below a voltage threshold of 5.5 V based on the battery 310 becoming disconnected from the system 300.

When the APL event is detected, the switch 330 may change from being connected to the battery 310 to being connected to the step-down regulator 320. When the switch 330 is connected to the step-down regulator 320, the power hold-off capacitors 325 may discharge power to the second set of components 360. For example, current may flow from the power hold-off capacitors 325 to the step-down regulator 320, from the step-down regulator 320 to the switch 330, from the switch 330 to a capacitor, and from the capacitor to the second pre-regulator 355. This may allow the second set of components 360, such as the SSD, to perform an emergency data storing operation prior to experiencing a power loss. In some implementations, the emergency data storing operation may be an EPF data storing operation. In some other implementations, the emergency data storing operation may be an FQ data storing operation. The power hold-off capacitors 325 may be configured to discharge power for a time period (such as 5 ms to 25 ms) that is long enough to allow the second set of components 360 to perform the emergency data storing operation prior to experiencing the power loss. When the switch 330 is connected to the step-down regulator 320, the power hold-off capacitors 325 may not provide power to the first set of components 350.

As described herein, when voltage from a battery is outside of an operating range, a reverse under-voltage over-voltage protection circuit or a safety MCU may stop a reference clock to abort any host-to-SSD data transfer, may assert a power loss notification (PLN) signal, and may disconnect power backed up circuits from the battery. In some implementations, both the step-up regulator and the step-down regulator may remain on during the standard operation and during the APL. This may improve system efficiency. For example, keeping the step-up regulator and the step-down regulator in the on state during the standard operation and during the APL may allow redundant energy stored in the battery power plane and in the capacitors to be used as much as possible, which may improve the power hold-off time.

In some implementations, when the voltage from the battery is in an operating range (such as between 6 volts and 12 volts), the step-up regulator may charge energy into the power hold-off capacitors at a high voltage. When the voltage from the battery is outside of the operating range (such as below 6 volts), a reverse under-voltage over-voltage protection circuit or a safety monitor microcontroller unit (MCU) may stop a reference clock (REFCLK) to abort any host-to-SSD data transfer, may assert a power loss notification (PLN) signal, and may disconnect power backed up circuits from the battery. The output voltage of the step-down regulator may be set close to the under-voltage threshold in order to minimize an inrush current. The power backed-up subsystem may sustain working for a time (such as 5 ms to 25 ms) using the energy that is stored in the power hold-off capacitors. As a result, an optimized solution for power management and power hold-off in low form factor devices (such as BGA) and in automotive or other embedded systems is provided.

In some implementations, the output voltage of the step-down regulator may be set close to the under-voltage threshold in order to minimize an inrush current. The power backed-up subsystem may sustain working for the time (such as 5 ms to 25 ms) using the energy that is stored in the power hold-off capacitors. As a result, an optimized solution for power management and power hold-off in low form factor devices (such as BGA) and in automotive or other embedded systems is provided. The optimized power management and power hold-off solution may result in less electromagnetic interference (EMI) and less noise injected into the lower voltage circuitries (such as the SOC, DRAM, SSD, NAND, or NOR devices, among other examples) since the energy storage may happen close to the 12 V domain and far from the 3.3 V or 5 V domain. This may result in lower SSD cost since the SSD may not be required to have onboard capacitance, and may result in a lower system cost due to the power hold-off circuitry being centralized (and thereby avoiding duplications on individual devices) and due to the reduced capacitance (based on the voltage being stepped-up, thereby reducing the need for additional capacitance). Additionally, this may result in a lower 12 V fast cycling period behavior due to the increased efficiency of the system.

As indicated above, FIG. 3 is provided as an example. Other examples may differ from what is described with regard to FIG. 3.

Figure 4:
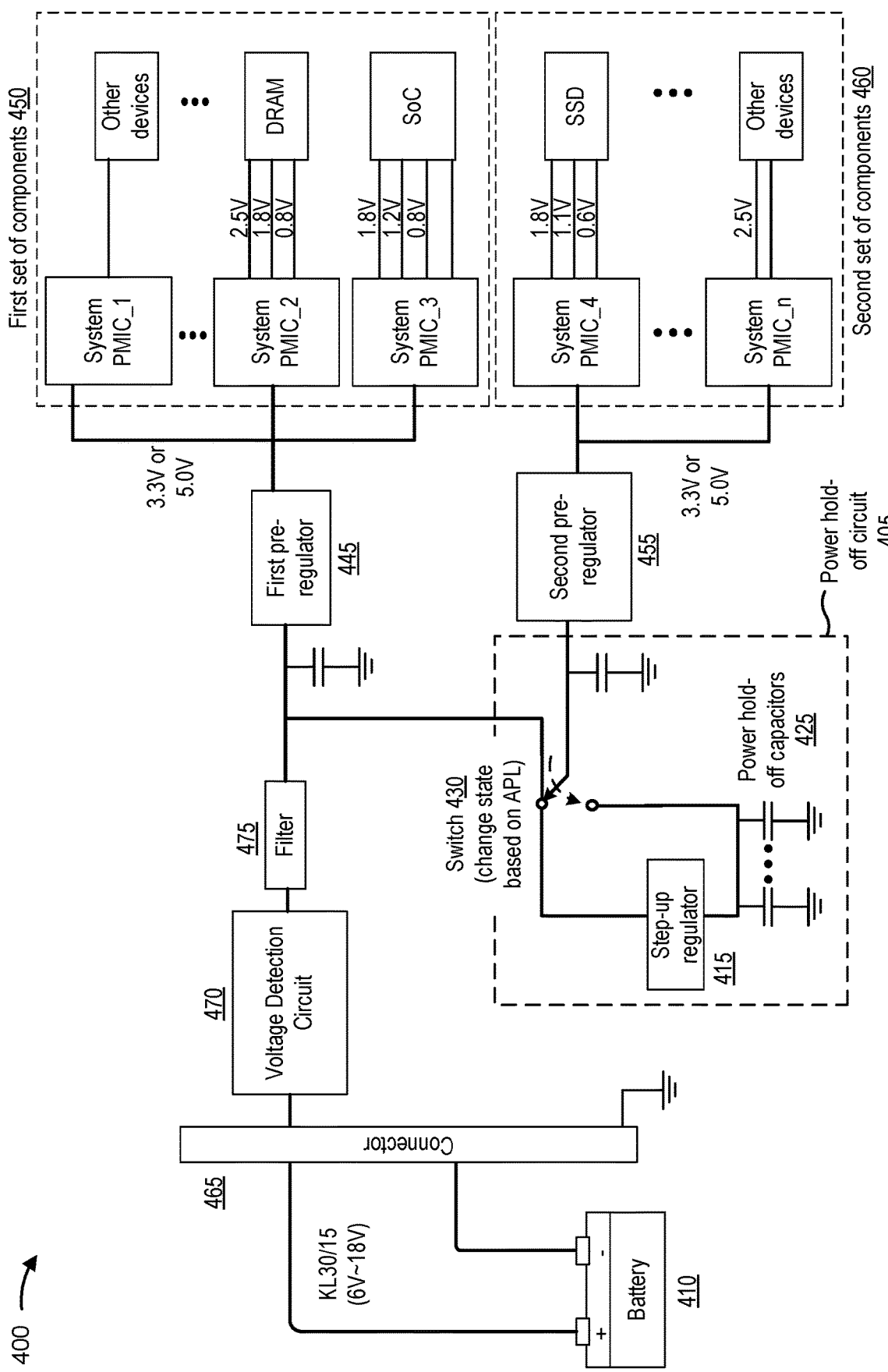
FIG. 4 is a diagram illustrating an example system that includes a power hold-off circuit.

FIG. 4 is a diagram illustrating an example system 400 that includes a power hold-off circuit. The system 400 may include the power hold-off circuit 405 and a battery 410. The power hold-off circuit 405 may include a step-up regulator 415 and one or more power hold-off capacitors 425. The step-up regulator 415 may be configured to receive an input voltage and to output an output voltage that is higher than the input voltage. The step-up regulator 415 may enable the power hold-off capacitors 425 to be charged at a higher voltage (such as 12 V, 18 V, or 35 V, among other examples). The power hold-off capacitors 425 may be configured to charge one or more system components or devices when a voltage from the battery falls below a voltage threshold and/or based on an occurrence of an APL event. The APL event may occur, for example, when the battery 410 becomes disconnected from the system 400. The power hold-off circuit 405 may include a switch 430. The switch 430 may be connected to the battery 410 when the voltage from the battery satisfies the voltage threshold and may be connected to the power hold-off capacitors 425 when the voltage from the battery does not satisfy the voltage threshold.

The system 400 may include one or more pre-regulators. A first pre-regulator 445 may be located in a path that is between the battery 410 and a first set of components 450. The first set of components 450 may include devices that do not require a power backup and/or may include devices that do not need to perform emergency data storing prior to a power loss. For example, the first set of components 450 may include a DRAM or a system-on-chip (SOC) device. A second pre-regulator 455 may be located in a path that is between the battery 410 and a second set of components 460. The second set of components 460 may include devices that require a power backup in the event of a power loss. For example, the second set of components may include an SSD.

In some implementations, the system 400 may include a connector 465. The connector 465 may be connected to the battery 410 and may be connected to a ground. The system 400 may include a voltage detection circuit 470. The voltage detection circuit 470 may be, for example, a reverse under-voltage over-voltage protection circuit. The voltage detection circuit 470 may be configured to detect whether the voltage from the battery satisfies the voltage threshold. For example, the voltage detection circuit 470 may detect that the voltage from the battery satisfies the voltage threshold based on the voltage from the battery being greater than, or greater than or equal to, the voltage threshold, or may detect that the voltage from the battery does not satisfy the voltage threshold based on the voltage from the battery being less than, or less than or equal to, the voltage threshold. The system 400 may include a filter 475. The filter 475 may be, for example, a low-pass filter, a high-pass filter, a band-pass filter, or a notch filter, among other examples.

In some implementations, the battery 410 may be in a connected state. When the battery 410 is in the connected state, the switch 430 may be connected to the step-up regulator 415. The voltage from the battery 410 may satisfy the voltage threshold. For example, the voltage from the battery 410 may be 6 V. 12 V, or 18 V. When the battery 410 is in the connected state, current may flow from the battery 410 to the connector 465, from the connector 465 to the voltage detection circuit 470, and from the voltage detection circuit 470 to the filter 475.

In some implementations, current may flow from the filter 475 to the first pre-regulator 445. For example, current may flow from the filter 475 to a capacitor, from the capacitor to the first pre-regulator 445, and from the first pre-regulator 445 to the first set of components 450. The first pre-regulator 445 may perform voltage regulation and may have an output voltage that is equal to 3.3 V or 5 V. The first set of components 450 may include one or more power management integrated circuits (PMICs), such as PMIC_1, PMIC_2, and PMIC_3. The first set of components 450 may include one or more devices that do not require a power backup based on the occurrence of the APL event. For example, the PMIC_2 may be connected to a DRAM, and the PMIC_3 may be connected to an SOC device.

In some implementations, current may flow from the filter 475 to the second pre-regulator 455. For example, current may flow from the filter 475 to a capacitor, from the capacitor to the second pre-regulator 455, and from the second pre-regulator 455 to the second set of components 460. The second pre-regulator 455 may perform voltage regulation and may have an output voltage that is equal to 3.3 V or 5 V. The second set of components 460 may include one or more PMICs, such as PMIC_4, and PMIC_n. Each of the PMICs may have an input voltage of 3.3 V or 5 V based on the output of the second pre-regulator 455. The second set of components 450 may include one or more devices that require a power backup based on the occurrence of the APL event. For example, the PMIC_4 may be connected to an SSD.

In some implementations, current may flow from the filter 475 to the power hold-off circuit 405. For example, current may flow from the filter 475 to an input of the power hold-off circuit 405. Additionally, current may flow from the input of the power hold-off circuit 405 to the step-up regulator 415, and from the step-up regulator 415 to the one or more power hold-off capacitors 425. This may enable the one or more power hold-off capacitors 425 to be charged by the step-up regulator 415 using power from the battery 410 at the higher voltage (such as 12 V, 18 V, or 35 V) when the battery 410 is in the connected state.

In some implementations, the system 400 may experience an APL event. The APL event may occur, for example, when the voltage from the battery 410 falls below the voltage threshold, such as when the battery 410 becomes disconnected from the system 400. In some implementations, the voltage detection circuit 470 (such as the reverse under-voltage over-voltage protection circuit) may detect that the voltage from the battery satisfies the voltage threshold based on the voltage from the battery being greater than, or greater than or equal to, the voltage threshold, or may detect that the voltage from the battery does not satisfy the voltage threshold based on the voltage from the battery being less than, or less than or equal to, the voltage threshold. In some implementations, the voltage threshold may be a voltage that is between 5 V and 6 V. For example, the voltage from the battery 410 may drop below a voltage threshold of 5.5 V based on the battery 410 becoming disconnected from the system 400.

When the APL event is detected, the switch 430 may change from being connected to the battery 410 to being connected to the power hold-off capacitors 425. When the switch 430 is connected to the power hold-off capacitors 425, the power hold-off capacitors 425 may discharge power to the second set of components 460. For example, current may flow from the power hold-off capacitors 425 to the switch 430, from the switch 430 to a capacitor, and from the capacitor to the second pre-regulator 455. This may allow the second set of components 460, such as the SSD, to perform an emergency data storing operation prior to experiencing a power loss. Based on the occurrence of the APL event, current may flow from the power hold-off capacitors 425 to the switch 430, from the switch 430 to a capacitor, from the capacitor to the second pre-regulator 455, and from the second pre-regulator 455 to the second set of component 460. This may reduce a complexity and/or cost of the system.

In some implementations, the emergency data storing operation may be an EPF data storing operation. In some other implementations, the emergency data storing operation may be an FQ data storing operation. The power hold-off capacitors 425 may be configured to discharge power for a time period (such as 5 ms to 25 ms) that is long enough to allow the second set of components 460 to perform the emergency data storing operation prior to experiencing the power loss. When the switch 430 is connected to the power hold-off capacitors 425, the power hold-off capacitors 425 may not provide power to the first set of components 450.

As described herein, when voltage from a battery is outside of an operating range, a reverse under-voltage over-voltage protection circuit or a safety MCU may stop a reference clock to abort any host-to-SSD data transfer, may assert a power loss notification (PLN) signal, and may disconnect power backed up circuits from the battery. The power backed-up subsystem may sustain working for the time (such as 5 ms to 25 ms) using the energy that is stored in the power hold-off capacitors. As a result, an optimized solution for power management and power hold-off in low form factor devices (such as BGA) and in automotive or other embedded systems is provided.

As indicated above, FIG. 4 is provided as an example. Other examples may differ from what is described with regard to FIG. 4.

Figure 5:
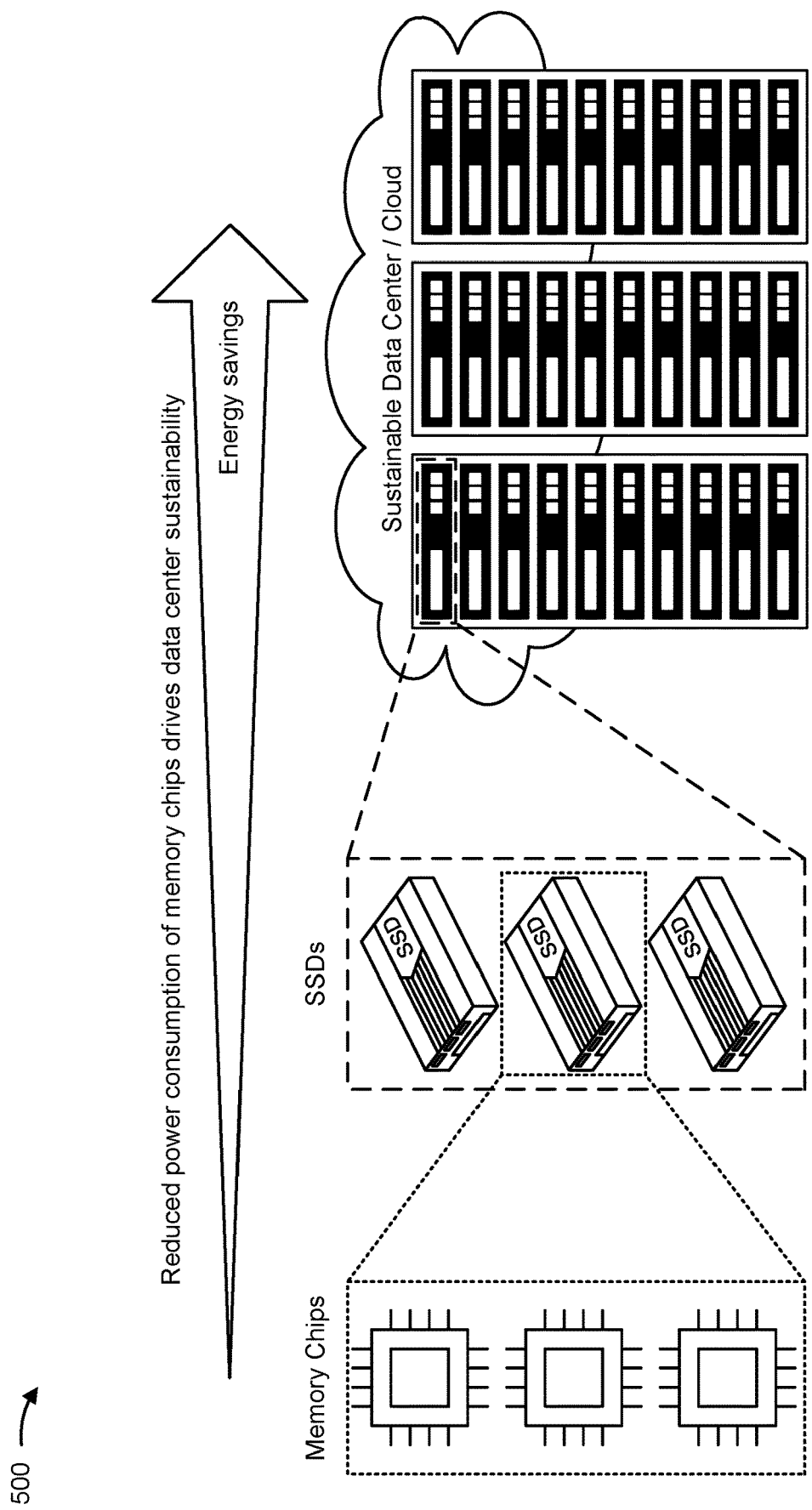
FIG. 5 is a diagram illustrating example systems in which the memory device described herein may be used.

FIG. 5 is a diagram illustrating example systems 500 in which the memory device 120 described herein may be used. In some implementations, one or more memory devices 120 may be included in a memory chip. Multiple memory chips may be packaged together and included in a higher-level system, such as a solid state drive (SSD) or another type of memory drive. Each SSD may include, for example, up to five memory chips, up to ten memory chips, or more. A data center or cloud computing environment may include multiple SSDs to store a large amount of data. For example, a data center may include hundreds, thousands, or more SSDs.

As described above, some implementations described herein reduce power consumption of a memory device 120. As shown in FIG. 5, this reduced power consumption drives data center sustainability and leads to energy savings because of the large volume of memory devices 120 included in a data center.

As indicated above, FIG. 5 is provided as an example. Other examples may differ from what is described with regard to FIG. 5.

Figure 6:
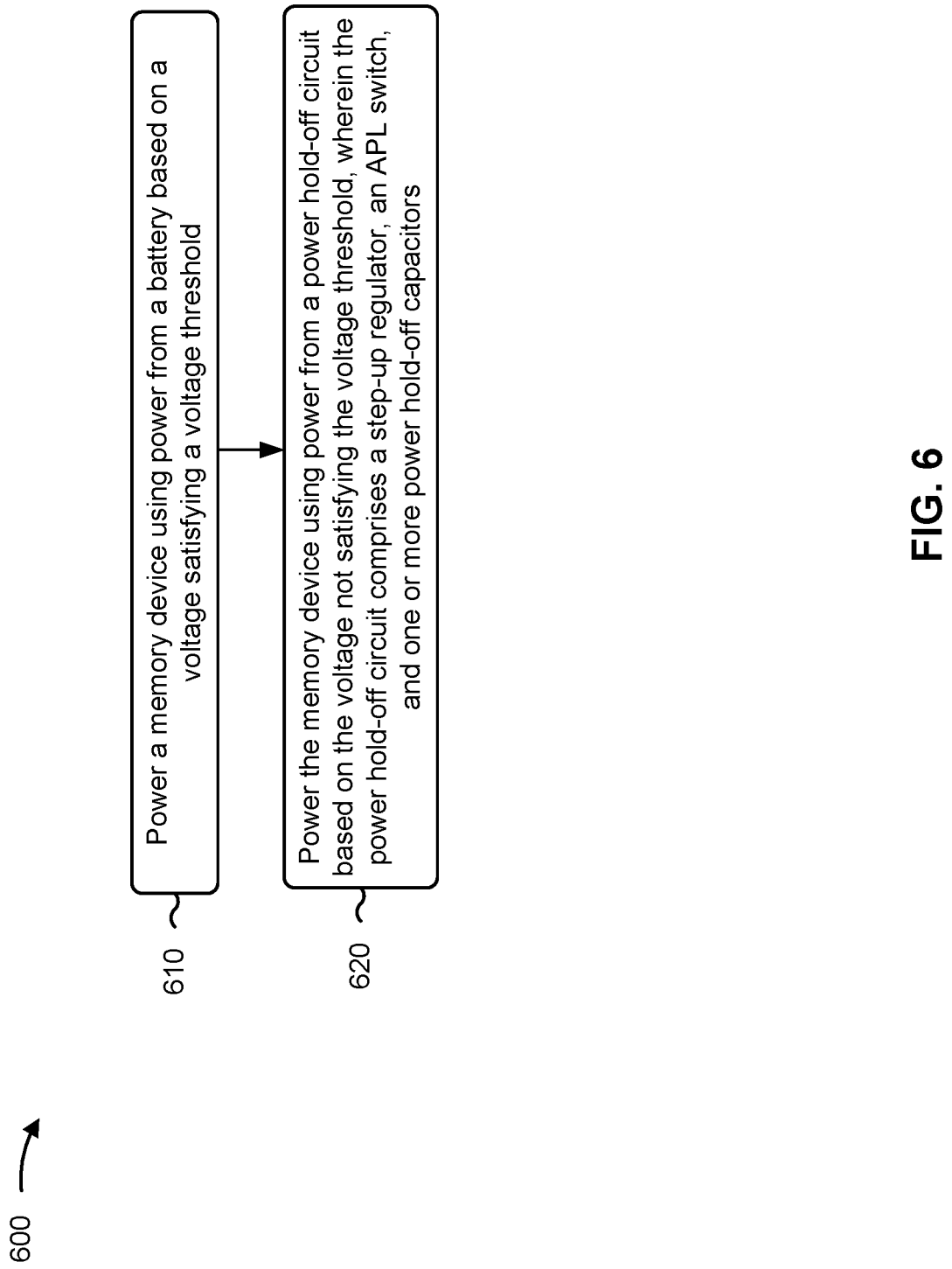
FIG. 6 is a flowchart of an example method associated with a power hold-off circuit.

FIG. 6 is a flowchart of an example method 600 associated with a power hold-off circuit. In some implementations, a system (e.g., the system 100) may perform or may be configured to perform the method 600. In some implementations, another device or a group of devices separate from or including the system (e.g., the power hold-off circuit 305 or the power hold-off circuit 405) may perform or may be configured to perform the method 600. Additionally, or alternatively, one or more components of the system (e.g., one or more components of the power hold-off circuit 305 or the power hold-off circuit 405) may perform or may be configured to perform the method 600. Thus, means for performing the method 600 may include the system and/or one or more components of the system. Additionally, or alternatively, a non-transitory computer-readable medium may store one or more instructions that, when executed by the system, cause the system to perform the method 600.

As shown in FIG. 6, the method 600 may include powering a memory device using power from a battery based on a voltage satisfying a voltage threshold (block 610). As further shown in FIG. 6, the method 600 may include powering the memory device using power from a power hold-off circuit based on the voltage not satisfying the voltage threshold (block 620). The power hold-off circuit may comprise a step-up regulator, an APL switch, and one or more power hold-off capacitors.

The method 600 may include additional aspects, such as any single aspect or any combination of aspects described below and/or described in connection with one or more other methods or operations described elsewhere herein.

In a first aspect, the power hold-off circuit further comprises a step-down regulator located between the APL switch and the one or more power hold-off capacitors.

In a second aspect, alone or in combination with the first aspect, powering the memory device using power from the power hold-off circuit based on the voltage not satisfying the voltage threshold comprises powering the memory device using power from the power hold-off circuit based on an occurrence of an APL event.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a system includes a battery; and a power hold-off circuit, wherein the power hold-off circuit comprises: a step-up regulator; a step-down regulator; an abrupt power-loss (APL) switch; and one or more power hold-off capacitors, wherein the APL switch is connected to the battery when a voltage from the battery satisfies a voltage threshold and is connected to the step-down regulator when the voltage from the battery does not satisfy the voltage threshold.

In some implementations, a system includes a battery; and a power hold-off circuit, wherein the power hold-off circuit comprises: a step-up regulator; an abrupt power-loss (APL) switch; and one or more power hold-off capacitors, wherein the APL switch is connected to the battery when a voltage from the battery satisfies a voltage threshold and is connected to the one or more power hold-off capacitors when the voltage from the battery does not satisfy the voltage threshold.

In some implementations, a method comprises: powering a memory device using power from a battery based on a voltage satisfying a voltage threshold; and powering the memory device using power from a power hold-off circuit based on the voltage not satisfying the voltage threshold, wherein the power hold-off circuit comprises: a step-up regulator; an abrupt power-loss (APL) switch; and one or more power hold-off capacitors.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
 a second set of components that includes a memory device;
 a battery;
 a power hold-off circuit, wherein the power hold-off circuit comprises:
  a step-up regulator;
  a step-down regulator;
  an abrupt power-loss (APL) switch; and
  one or more power hold-off capacitors,
  wherein the APL switch is connected to the battery when a voltage from the battery satisfies a voltage threshold and is connected to the step-down regulator when the voltage from the battery does not satisfy the voltage threshold; and
 a second pre-regulator, wherein the second pre-regulator is located in a path between the battery and the second set of components when the APL switch is connected to the step-up regulator; and wherein the second pre-regulator is located in a path between the power hold-off circuit and the second set of components when the APL switch is connected to the step-down regulator.

2. The system of claim 1,
wherein the step-up regulator is in an on state when the voltage from the battery satisfies the voltage threshold and when the voltage from the battery does not satisfy the voltage threshold.

3. The system of claim 1, further comprising:
a first set of components; and
a first pre-regulator that is located in a path between the battery and the first set of components.

4. The system of claim 3,
wherein the first set of components, the second set of components, and the one or more power hold-off capacitors receive power from the battery when the APL switch is connected to the battery.

5. The system of claim 3,
wherein the second set of components receive power from the one or more power hold-off capacitors when the APL switch is connected to the step-down regulator.

6. The system of claim 5,
wherein the first set of components do not receive power from the one or more power hold-off capacitors when the APL switch is connected to the step-down regulator.

7. The system of claim 3, further comprising:
a connector that is connected to the battery;
a voltage detection circuit that is connected to the connector; and
a filter that is connected to the voltage detection circuit.

8. The system of claim 3,
wherein the one or more power hold-off capacitors are configured to hold a charge for a time period after an occurrence of an APL event.

9. The system of claim 8,
wherein the occurrence of the APL event is based on a voltage drop or the battery being disconnected from the first set of components and the second set of components.

10. A system, comprising:
a second set of components that includes a memory device;
a battery;
a power hold-off circuit, wherein the power hold-off circuit comprises:
a step-up regulator;
an abrupt power-loss (APL) switch; and
one or more power hold-off capacitors,
wherein the APL switch is connected to the battery when a voltage from the battery satisfies a voltage threshold and is connected to the one or more power hold-off capacitors when the voltage from the battery does not satisfy the voltage threshold; and
a second pre-regulator,
wherein the second pre-regulator is located in a path between the battery and the second set of components when the APL switch is connected to the battery; and
wherein the second pre-regulator is located in a path between the power hold-off circuit and the second set of components when the APL switch is connected to the one or more power hold-off capacitors.

11. The system of claim 10, further comprising:
a first set of components; and
a first pre-regulator that is located in a path between the battery and the first set of components.

12. The system of claim 11,
wherein the first set of components, the second set of components, and the one or more power hold-off capacitors receive power from the battery when the APL switch is connected to the battery.

13. The system of claim 11,
wherein the second set of components receive power from the one or more power hold-off capacitors when the APL switch is connected to the one or more power hold-off capacitors.

14. The system of claim 13,
wherein the first set of components do not receive power from the one or more power hold-off capacitors when the APL switch is connected to the one or more power hold-off capacitors.

15. The system of claim 11, further comprising:
a connector that is connected to the battery;
a voltage detection circuit that is connected to the connector; and
a filter that is connected to the voltage detection circuit.

16. The system of claim 11,
wherein the one or more power hold-off capacitors are configured to hold a charge for a time period after an occurrence of an APL event.

17. The system of claim 16,
wherein the occurrence of the APL event is based on a voltage drop or the battery being disconnected from the first set of components and the second set of components.

18. A method comprising:
powering a memory device using power from a battery based on a voltage satisfying a voltage threshold; and
powering the memory device using power from a power hold-off circuit based on the voltage not satisfying the voltage threshold,
wherein the power hold-off circuit comprises:
a step-up regulator;
an abrupt power-loss (APL) switch; and
one or more power hold-off capacitors,
wherein a pre-regulator is located in a path between the battery and the memory device when the APL switch is connected to the battery; and
wherein the pre-regulator is located in a path between the power hold-off circuit and the memory device when the APL switch is connected to the one or more power hold-off capacitors.

19. The method of claim 18,
wherein the power hold-off circuit further comprises a step-down regulator located between the APL switch and the one or more power hold-off capacitors.

20. The method of claim 18,
wherein powering the memory device using power from the power hold-off circuit based on the voltage not satisfying the voltage threshold comprises powering the memory device using power from the power hold-off circuit based on an occurrence of an APL event.

* * * * *